United States Patent
Park et al.

(10) Patent No.: US 9,723,428 B2
(45) Date of Patent: Aug. 1, 2017

(54) INTERNET-OF-THINGS SYSTEM FOR PUBLIC TRANSPORTATION SERVICE AND METHOD OF OPERATING SAME

(71) Applicant: ELECTRONICS AND TELECOMMUNICATIONS RESEARCH INSTITUTE, Daejeon (KR)

(72) Inventors: Jung-Soo Park, Daejeon (KR); Yong-Geun Hong, Daejeon (KR); Myung-Ki Shin, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 192 days.

(21) Appl. No.: 14/602,399

(22) Filed: Jan. 22, 2015

(65) Prior Publication Data

US 2015/0205991 A1 Jul. 23, 2015

(30) Foreign Application Priority Data

Jan. 22, 2014 (KR) ........................ 10-2014-0007695

(51) Int. Cl.
  *H04Q 5/22* (2006.01)
  *H04W 4/00* (2009.01)
  (Continued)

(52) U.S. Cl.
  CPC ......... *H04W 4/005* (2013.01); *H04L 61/2092* (2013.01); *H04W 4/008* (2013.01);
  (Continued)

(58) Field of Classification Search
  CPC ...... H04W 4/046; H04W 4/008; G06Q 10/02; H04L 61/6004
  (Continued)

(56) References Cited

U.S. PATENT DOCUMENTS

2002/0094829 A1* 7/2002 Ritter .................... H04H 20/62
  455/517
2006/0221921 A1* 10/2006 Kniveton .......... H04L 29/12207
  370/338

(Continued)

FOREIGN PATENT DOCUMENTS

| JP | 2004-102644 | 4/2004 |
| JP | 2008-52331 | 3/2008 |
| KR | 10-2011-0062031 | 6/2011 |

*Primary Examiner* — Vernal Brown
(74) *Attorney, Agent, or Firm* — Kile Park Reed & Houtteman PLLC

(57) ABSTRACT

An Internet-of-Things (IoT) system for public transportation service and a method of operating the same are disclosed. The IoT system includes on-vehicle devices, a management server, a plurality of bus stop access points (APs), and a wired/wireless bus stop access point (AP) communication network. The on-vehicle devices are mounted within a bus, i.e., a public transportation means. The management server is connected to the bus over an Internet, i.e., a wireless communication means. The plurality of bus stop APs are short distance communication APs, and are each provided in each bus stop at which the bus stops and configured to enable information to be exchanged between the bus stop and the bus. The wired/wireless bus stop AP communication network connects the plurality of bus stop APs. The management server performs Internet access processing to connect the bus stop AP communication network and an external terminal.

10 Claims, 13 Drawing Sheets

(51) Int. Cl.
*H04W 4/04* (2009.01)
*H04L 29/12* (2006.01)
*H04L 29/08* (2006.01)

(52) U.S. Cl.
CPC ......... *H04W 4/046* (2013.01); *H04L 61/6004* (2013.01); *H04L 61/6059* (2013.01); *H04L 61/6068* (2013.01); *H04L 67/12* (2013.01)

(58) Field of Classification Search
USPC ...................................................... 340/10.3
See application file for complete search history.

(56) References Cited

U.S. PATENT DOCUMENTS

| | | |
|---|---|---|
| 2007/0024440 A1 | 2/2007 | Moran et al. |
| 2011/0006922 A1* | 1/2011 | Tsuboi ................... G08G 1/123 340/994 |
| 2012/0190397 A1 | 7/2012 | Jung et al. |

* cited by examiner (RELATED ART)

INTERNET-OF-THINGS SYSTEM FOR PUBLIC TRANSPORTATION SERVICE AND METHOD OF OPERATING SAME

CROSS-REFERENCE TO RELATED APPLICATION

This application claims the benefit of Korean Patent Application No. 10-2014-0007695, filed Jan. 22, 2014, which is hereby incorporated by reference herein in its entirety.

BACKGROUND

1. Technical Field

Embodiments of the present invention relate generally to the Internet of Things (IoT) in which small-sized information communication devices attached to things form a communication network and share information therebetween and, more particularly, to an IoT system for public transportation service and a method of operating the same, which are capable of acquiring information about one or more passengers on a public transportation means (e.g., a bus, a subway train, a train, a ship, or an airplane) and information about the public transportation means and then providing a specific data service (e.g., bus stop or line guidance, transportation information, an advertisement service, or a multimedia data service) to the passengers.

2. Description of the Related Art

Small-sized information communication devices attached to things enable information about the things to be automatically acquired, or enable the things to share information therebetween over a communication network. A concept and technology in which things connect to a network using communication devices attached to themselves or form a communication network and then share information therebetween as described above is referred to as the IoT, Machine-to-Machine (M2M), or Machine-Type Communications (MTC). In such a network environment, information can be shared between all objects because communication networks can be set up between things as well as between humans and between humans and things.

As a related art, Korean Patent Application Publication No. 10-2011-0062031 A discloses a system for providing a Representational State Transfer (REST)-based bus related information service, which is illustrated in FIG. 1. This technology provides a client for requesting and sending Hypertext Transfer Protocol (HTTP)-based bus-related information, and a REST-based bus-related information provision device for managing bus-related information including resources and links represented based on REST, searching for corresponding information in response to an HTTP-based bus-related information request from the client, and sending the retrieved information to the client. Accordingly, bus-related information resources and links can be constructed based on REST, and a user can easily acquire bus-related information at a desired time via an HTTP client application that can be installed on the client.

As another related art, Japanese Patent Application Publication No. 2008-052331 discloses a bus location system, which is illustrated in FIG. 2. This technology relates to a bus location system having a function of acquiring information about locations where bus users get on and off a bus and information about the locations of bus users. The bus location system includes an on-vehicle unit installed in each bus and configured to perform radio communication, a relay unit installed in each bus stop or location and configured to perform radio relay, and a host installed in a head office and configured to acquire the running status of the bus. The bus location system is characterized in that information that is transmitted by a radio tag carried by a passenger of a bus and specifies at least the passenger is sent to the host via the on-vehicle unit and/or the relay unit.

As still another related art, U.S. Patent Application Publication No. 2007/0024440 A1 discloses a school bus tracking and notification system, which is illustrated in FIG. 3. In this technology, an ID is assigned to each school bus and a mobile station is provided in the school bus. The ID and telephone number of the mobile station of the school bus are stored in the database of a tracking application device. A parent in his or her home sends a message, including the ID of the school bus and an inquiry radius (distance), to the tracking application device via a terminal. In this case, the message is a short message service message, and is sent to a particular number or address via which access can be made to the tracking application device. The tracking application device periodically polls the mobile station of the school bus and the terminal of the parent. When the school bus enters an area within the radius, the tracking application device sends a message, indicating that the bus is approaching, to the terminal of the parent. This system can also be applied to the tracking of other types of vehicles, objects (e.g., packages), and/or humans.

In connection with this, Japanese Patent Application Publication No. 2004-102644 disclose a technology related to "Bus service support system."

SUMMARY

At least some embodiments of the present invention are directed to the provision of an IoT system for public transportation service and a method of operating the same, which are capable of acquiring information about one or more passengers within a public transportation means, such as a bus, a subway train, a train, a ship, or an airplane, and information about the public transportation means.

Furthermore, at least some embodiments of the present invention are directed to the provision of an IoT system for public transportation service and a method of operating the same, which are capable of providing not only an Internet service but also a specific data service (e.g., bus stop or line guidance, transportation information, an advertisement service, or a multimedia data service) to the terminals of one or more passengers on a public transportation means.

In accordance with an aspect of the present invention, there is provided an IoT system for public transportation service, the IoT system including on-vehicle devices mounted within a bus as a means of public transportation; a management server connected to the bus over an Internet as a means of wireless communication; a plurality of bus stop access points (APs) as a means of short distance communication APs, each provided in each bus stop at which the bus stops and configured to enable information to be exchanged between the bus stop and the bus; and a wired/wireless bus stop access point (AP) communication network configured to connect the plurality of bus stop APs; wherein the management server performs Internet access processing to connect the bus stop AP communication network and an external terminal.

In accordance with another aspect of the present invention, there is provided a method of providing a service to a passenger terminal of a passenger on a vehicle in a method of operating an IoT system for public transportation service, the method of providing a service including 1) when the passenger who carries the passenger terminal gets on the vehicle, reading, by an entrance tag reader, a tag ID from the passenger terminal and sending, by the entrance tag reader, the tag ID to an on-vehicle AP; 2) generating, by the on-vehicle AP, a passenger ID that is used to identify the passenger terminal of the passenger who has got on the vehicle; 3) sending, by the on-vehicle AP, the generated passenger ID, a vehicle ID, and an IPv6_uPrefix to the passenger terminal via the entrance tag reader; 4) hashing, by the passenger terminal of the passenger on the vehicle, the IPv6_uPrefix, the vehicle ID, and the passenger ID; 5) generating, by the passenger terminal of the passenger who has got on the vehicle, the IPv6 address of the passenger terminal using the results of the hashing; and 6) performing, by the passenger terminal, Internet packet communication with a management server via the on-vehicle AP using the generated IPv6 address.

In accordance with still another aspect of the present invention, there is provided a method of collecting information about a bus and a bus stop in a method of operating an IoT system for public transportation service, the method of collecting information including 1) previously registering a vehicle ID, including a line ID and bus ID of the bus, with a bus DB of a management server; 2) when the bus enters the bus stop, sending, by the on-vehicle AP disposed on the bus, the vehicle ID, including the line ID and bus ID of the bus, to a bus stop AP via a bus stop AP communication unit; 3) sending, by the bus stop AP having received the vehicle ID, the received vehicle ID and a bus stop ID to the management server over the bus stop AP communication network; and 4) updating, by the management server, the received vehicle ID and bus stop ID, and storing, by the management server, the updated vehicle ID and bus stop ID in the bus DB.

In accordance with still another aspect of the present invention, there is provided a method of collecting information about a passenger terminal in a method of operating an IoT system for public transportation service, the method of collecting information including 1) when a passenger who carries the passenger terminal gets on a vehicle, reading, by an entrance tag reader, a tag ID from the passenger terminal and providing, by the entrance tag reader, the tag ID to an on-vehicle AP; 2) generating, by the on-vehicle AP, a passenger ID that is used to identify the passenger terminal of the passenger who has got on the vehicle; 3) sending, by the on-vehicle AP, the generated passenger ID, a vehicle ID, and an IPv6_uPrefix to the passenger terminal via the entrance tag reader; 4) sending, by the on-vehicle AP, information about the vehicle ID, the passenger ID, and the tag ID of the passenger to a management server; and 5) storing, by the management server, the received information in a passenger DB; and, when the passenger gets off the vehicle after getting on the vehicle, 6) reading, by an exit tag reader, the tag ID from the passenger terminal, providing, by an exit tag reader, the read tag ID to the on-vehicle AP, and sending, by the on-vehicle AP, information about the vehicle ID, the passenger ID and the tag ID of the passenger to the management server 200; and 7) deleting, by the management server, the received information from data stored in the passenger DB.

In accordance with still another aspect of the present invention, there is provided a method of making an inquiry about information about a passenger terminal and also providing an additional service in a method of operating an IoT system for public transportation service, the method of making an inquiry about information about a passenger terminal and also providing an additional service including 1) sending, by an external terminal connected to a management server over an Internet, an inquiry request using a tag ID of the passenger terminal as inquiry data; 2) searching, by the management server, a passenger DB for information including the tag ID; 3) notifying, by the management server, the external terminal that a passenger of the tag ID has not got on a vehicle if, as a result of the search, it is determined that the information including the tag ID is not present in the passenger DB; 4) sending, by the management server, a stored vehicle ID and passenger ID, together with the tag ID, to the external terminal if, as a result of the search, it is determined that the information including the corresponding tag ID is present in the passenger DB; 5) generating, by the external terminal, an IPv6 address of the passenger terminal by hashing an IPv6_uPrefix, the vehicle ID, and the passenger ID; and 6) providing, by the external terminal, a service to the passenger terminal of the passenger on the vehicle via an on-vehicle AP of the bus using the generated IPv6 address.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

The following description illustrates merely the principle of the present invention. Although all apparatuses have not been clearly described or illustrated in the present specification, those skilled in the art can implement various apparatuses that implement the principle of the present invention and that fall within the concept and scope of the present invention. Furthermore, it should be understood that conditional terms and embodiments described in the present specification are explicitly intended merely for an understanding of the concept and scope of the present invention and the present invention is not limited to these terms and embodiments. Furthermore, it should be understood that all detailed descriptions that describe specific embodiments as well as the principle, aspects and embodiments of the present invention are intended to include structural and functional equivalents thereto.

The objects, characteristics and advantages of the present invention will become more apparent from the following detailed description given with reference to the accompanying drawings. In the following description of the present invention, detailed descriptions of the known functions and constitutions will be omitted if they are deemed to make the gist of the present invention unnecessarily obscure. Embodiments of the present invention will be described in detail below with reference to the accompanying drawings.

Figure 1:
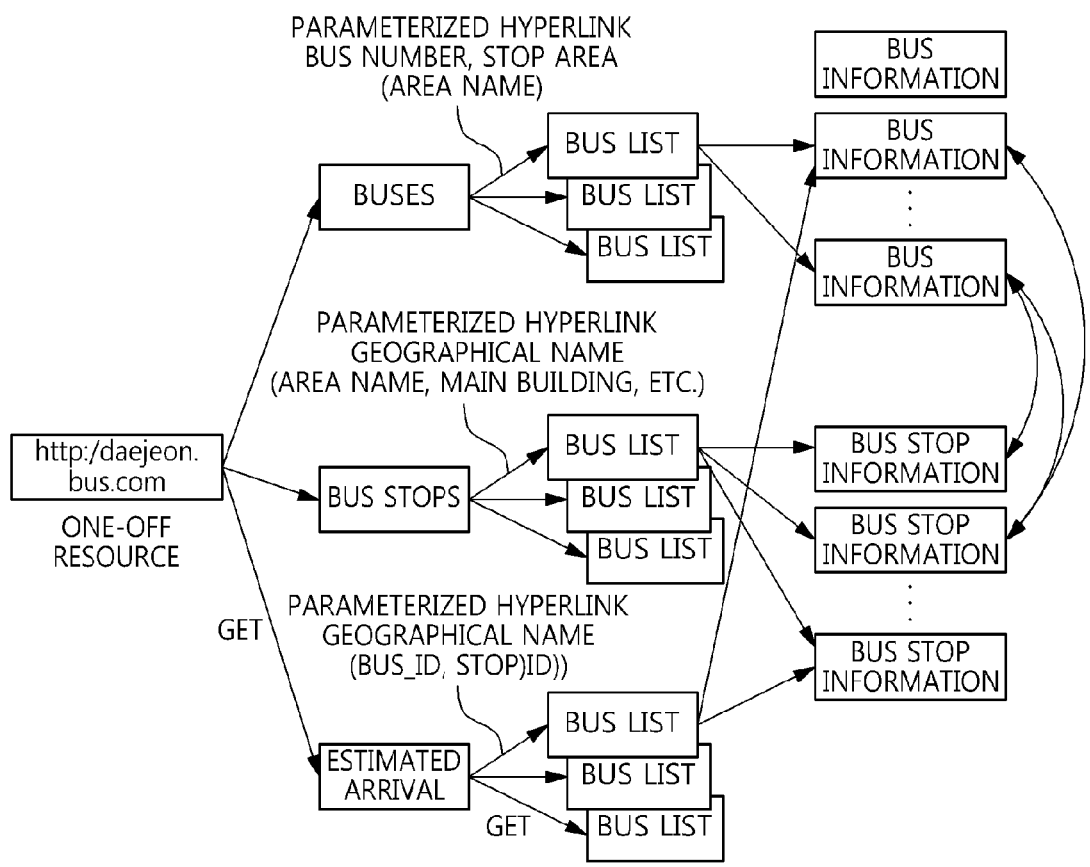
FIG. 1 is a diagram illustrating the configuration of a REST-based bus-related information provision system as a related art.
Figure 2:
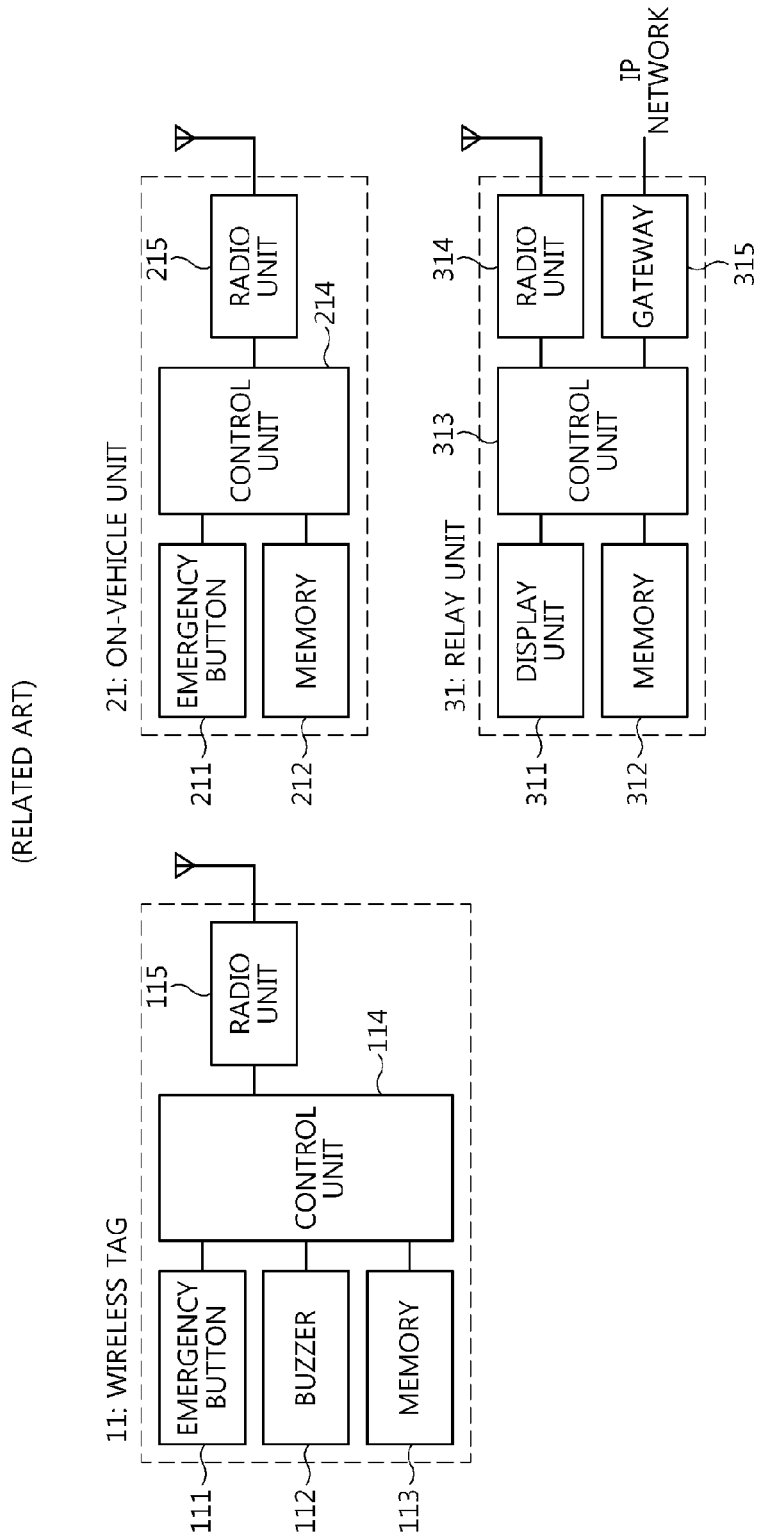
FIG. 2 is a diagram illustrating the configuration of a bus location system as another related art.
Figure 3:
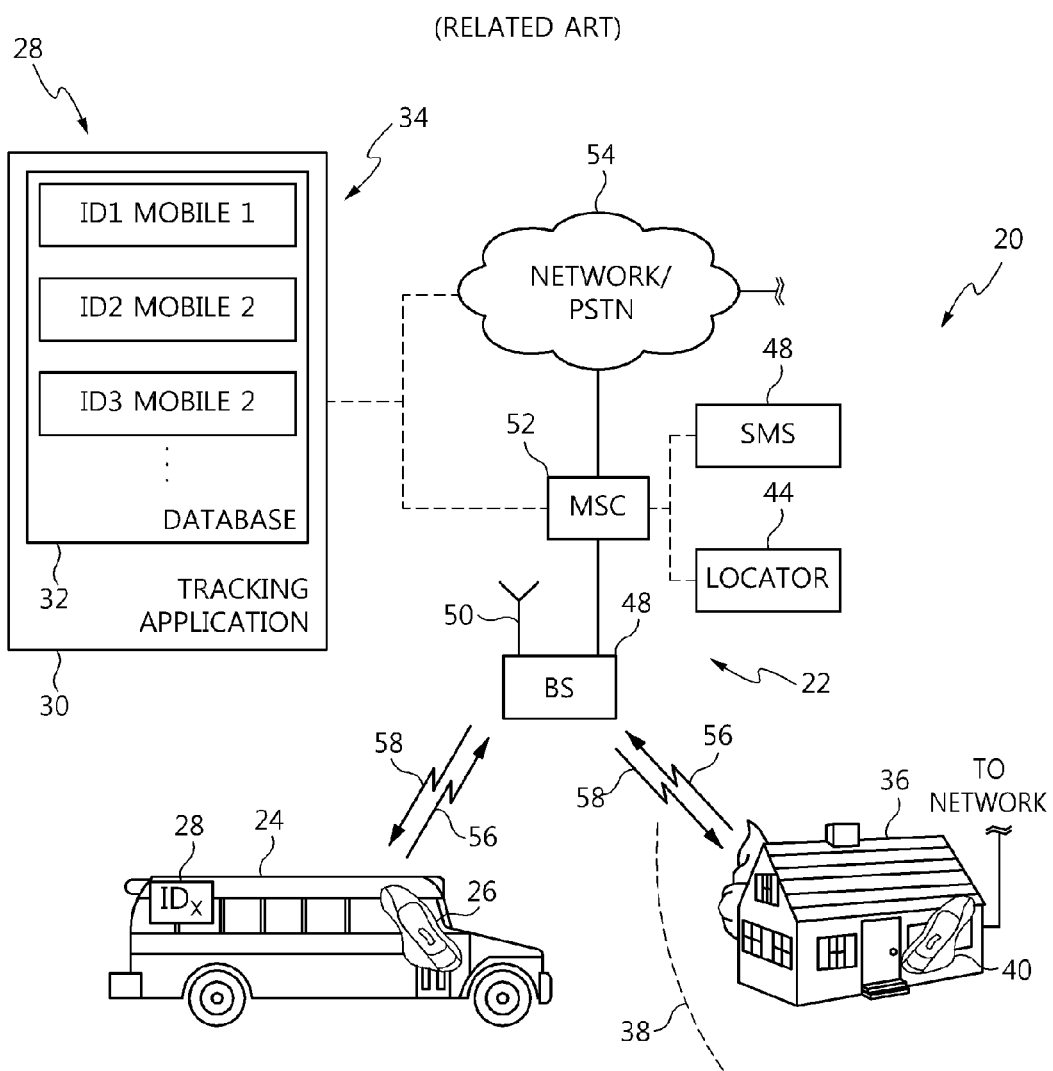
FIG. 3 is a diagram illustrating the configuration of a school bus tracking and notification system as still another related art.
Figure 4:
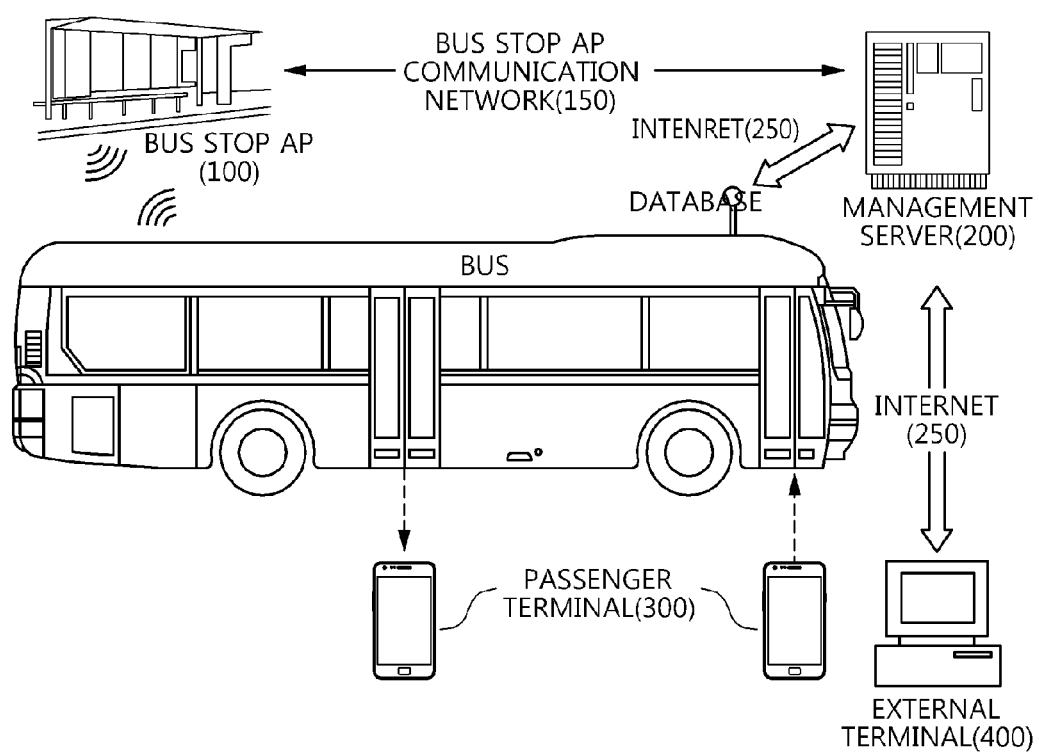
FIG. 4 is a diagram illustrating the overview of an IoT system for public transportation service according to an embodiment of the present invention.

FIG. 4 is a diagram illustrating the overview of an IoT system for public transportation service according to an embodiment of the present invention. In the present invention, a public transportation means, i.e., the object of the present invention, may include a subway train, a train, a ship, and an airplane in addition to a bus, but has no specific limitation. In the following description, a bus is described as an example in order to help an understanding of the characteristic configuration of the present invention.

The IoT system for public transportation service according to an embodiment of the present invention includes a bus, i.e., a public transportation means, and a management server 200 connected to the bus over the Internet 250, i.e., a wireless communication means. The IoT system further includes a plurality of bus stop access points (APs) 100, i.e., short distance communication APs, configured to enable information to be exchanged between the bus and bus stops at which the bus stops. The plurality of the bus stop APs 100 is connected to the management server 200 over a wired/wireless bus stop access point (AP) communication network 150. Accordingly, the management server 200 processes access to the Internet 250 along with the bus stop AP communication network 150. Furthermore, an external terminal 400 may be connected to the management server 200 over the Internet 250. A user, i.e., a passenger, of the bus receives public transportation service via a corresponding passenger terminal 300 during a period from the time at which the user gets on the bus to the time at which the user gets off the bus.

Figure 5:
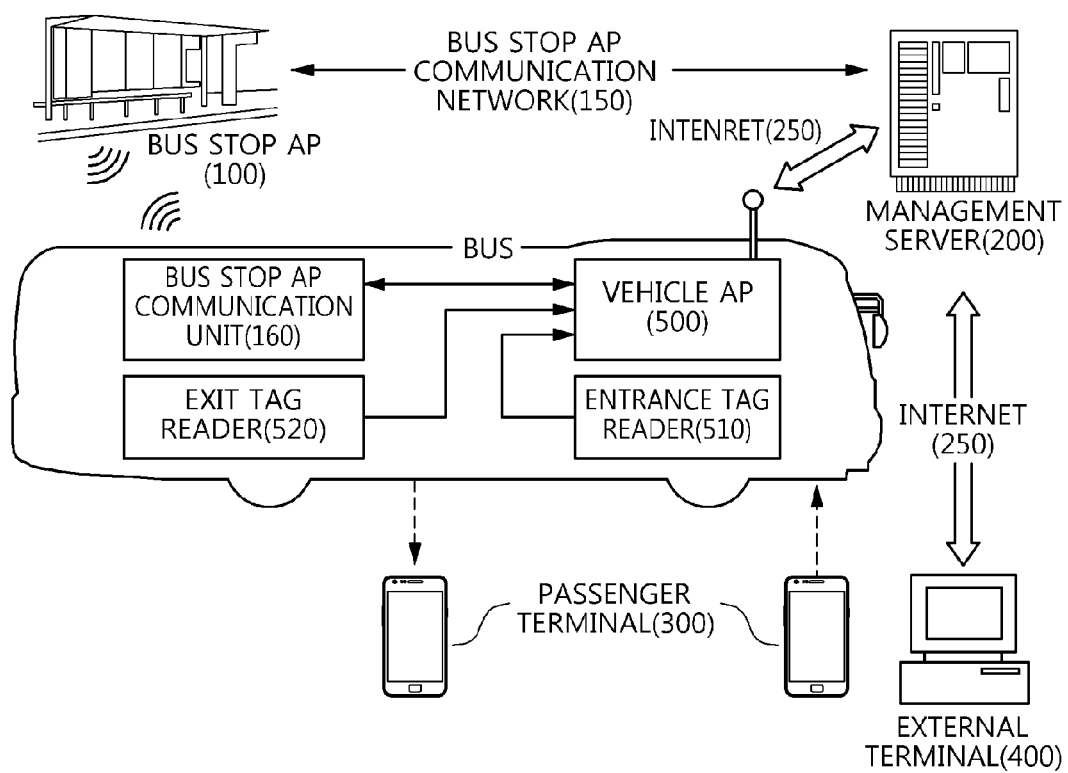
FIG. 5 is a diagram illustrating the configuration of on-vehicle devices within a bus according to an embodiment of the present invention.

FIG. 5 is a diagram illustrating the configurations of on-vehicle devices within a bus in the configuration of the IoT system for public transportation service according to the embodiment of the present invention. In the configuration of the IoT system for public transportation service according to the embodiment of the present invention described with reference to FIG. 4, the bus is equipped with a bus stop AP communication unit 160 configured to communicate with the bus stop APs 100 that enable bus stops and the bus to exchange information. Furthermore, the bus is further equipped with an entrance tag reader 510 and an exit tag reader 520 configured to read a tag contained in each passenger terminal 300. The entrance tag reader 510 reads tag information from a corresponding passenger terminal 300 when each passenger gets on the bus. The exit tag reader 520 reads tag information from a corresponding passenger terminal 300 when each passenger gets off the bus. Accordingly, information about one or more passengers on the bus may be checked via the entrance tag reader 510 and the exit tag reader 520. The entrance tag reader 510 and the exit tag reader 520 may be of a contact type, a contactless type or both, and may each include a reader gate configured to enable bi-directional communication via a radio frequency identification (RFID) or near field communication (NFC) method.

The bus stop AP communication unit 160, the entrance tag reader 510, and the exit tag reader 520 are connected to an on-vehicle AP 500. In the embodiment of the present invention, the on-vehicle AP 500 performs wireless packet communication with the management server 200 over the Internet 250, and collects and manages tag information that has been read by the entrance tag reader 510 and the exit tag reader 520 from the passenger terminal 300. Furthermore, the on-vehicle AP 500 has a small base station function of forming a network along with one or more passenger terminals 300 on the bus and also controlling packet communication with the management server 200.

Figure 6:
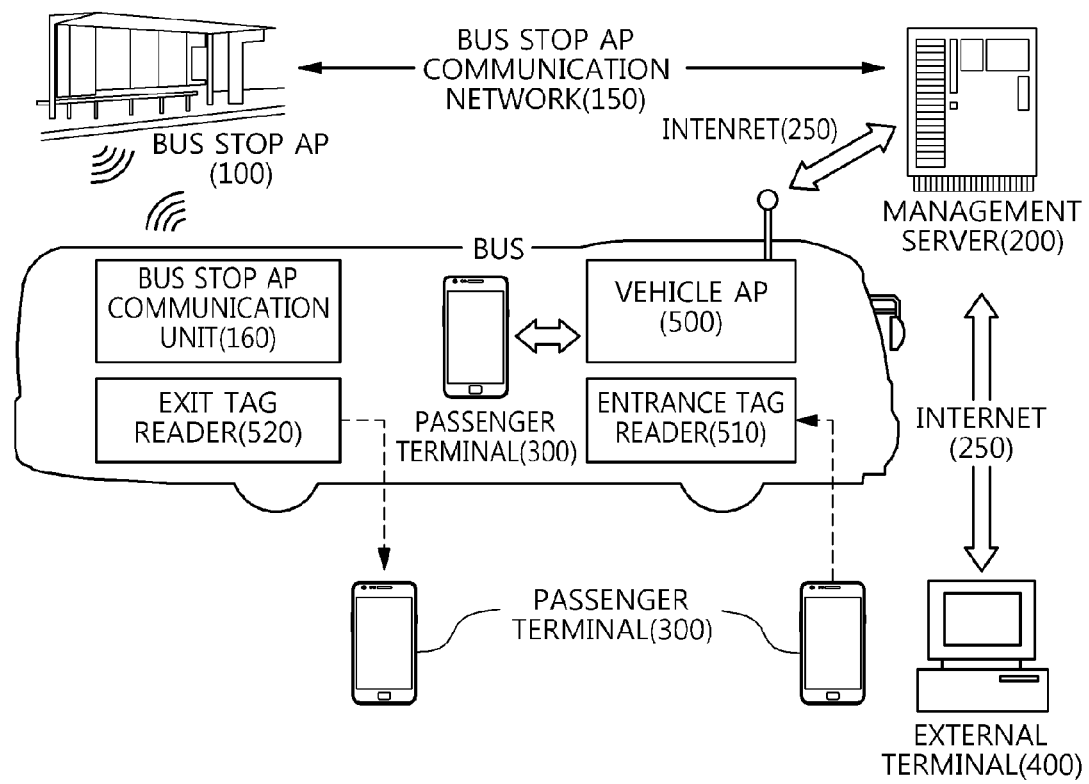
FIG. 6 is a diagram illustrating an operational relationship with a passenger terminal in the IoT system according to the embodiment of the present invention.

FIG. 6 is a diagram illustrating the operational relationship with the passenger terminals in the IoT system according to the embodiment of the present invention. As described above with reference to FIG. 5, in the IoT system according to the embodiment of the present invention, when each passenger gets on the bus, the entrance tag reader 510 reads tag information from a corresponding passenger terminal 300, and then transfers the read tag information to the on-vehicle AP 500. The entrance tag reader 510 can perform bi-directional communication, and may transfer information, provided by the on-vehicle AP 500, to the passenger terminals 300. When each passenger gets off the bus, the exit tag reader 520 reads tag information from a corresponding passenger terminal 300, and then transfers the read tag information to the on-vehicle AP 500. Accordingly, the on-vehicle AP 500 may form a network with respect to only one or more passengers on the bus using the tag information of the passengers who have not got off the bus after getting on the bus by referring to the tag information read by the entrance tag reader 510 and the exit tag reader 520. Furthermore, the on-vehicle AP 500 may provide an Internet service and/or a specific information service to the passenger terminals 300 of the passengers on the bus via the management server 200.

Figure 7:
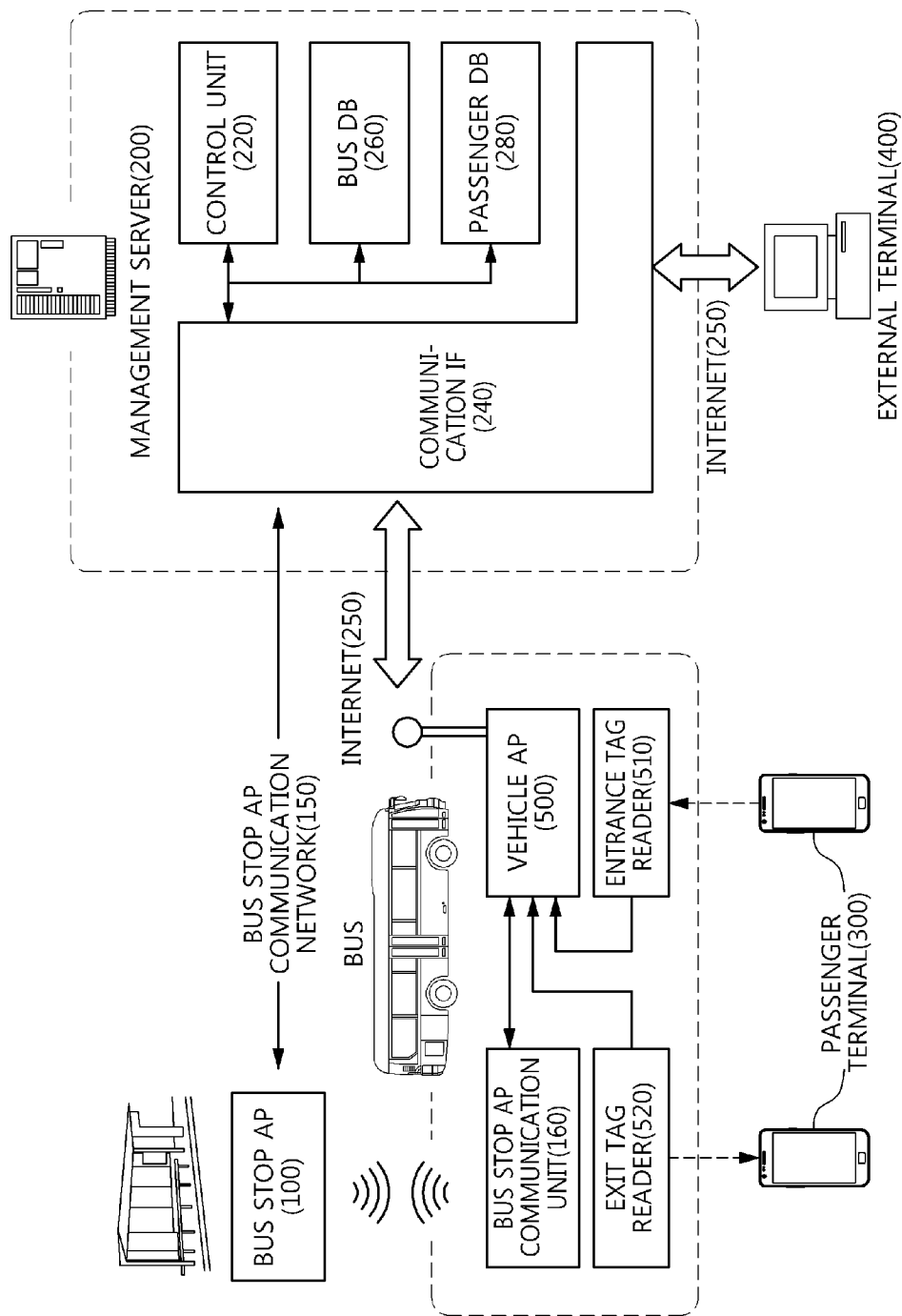
FIG. 7 is a diagram illustrating the configuration of a management server according to an embodiment of the present invention.

FIG. 7 is a diagram illustrating the configuration of the management server in the IoT system for public transportation service according to the embodiment of the present invention. In the IoT system for public transportation service according to the embodiment of the present invention, the management server 200 includes a central control unit 220, and a communication interface (IF) 240 configured to connect the management server 200 to both the bus stop AP communication network 150 for connecting the bus stop APs 100 and the Internet 250 for connecting the external terminal 400 and on-vehicle APs 500 provided in respective vehicles. Furthermore, a bus database (DB) 260 for receiving information about buses from the respective on-vehicle APs 500 and storing the received information, and a passenger DB 280 for storing passenger information including tag information provided by the passenger terminals 300 of one or more passengers on each bus are connected to the control unit 220.

Figure 8:
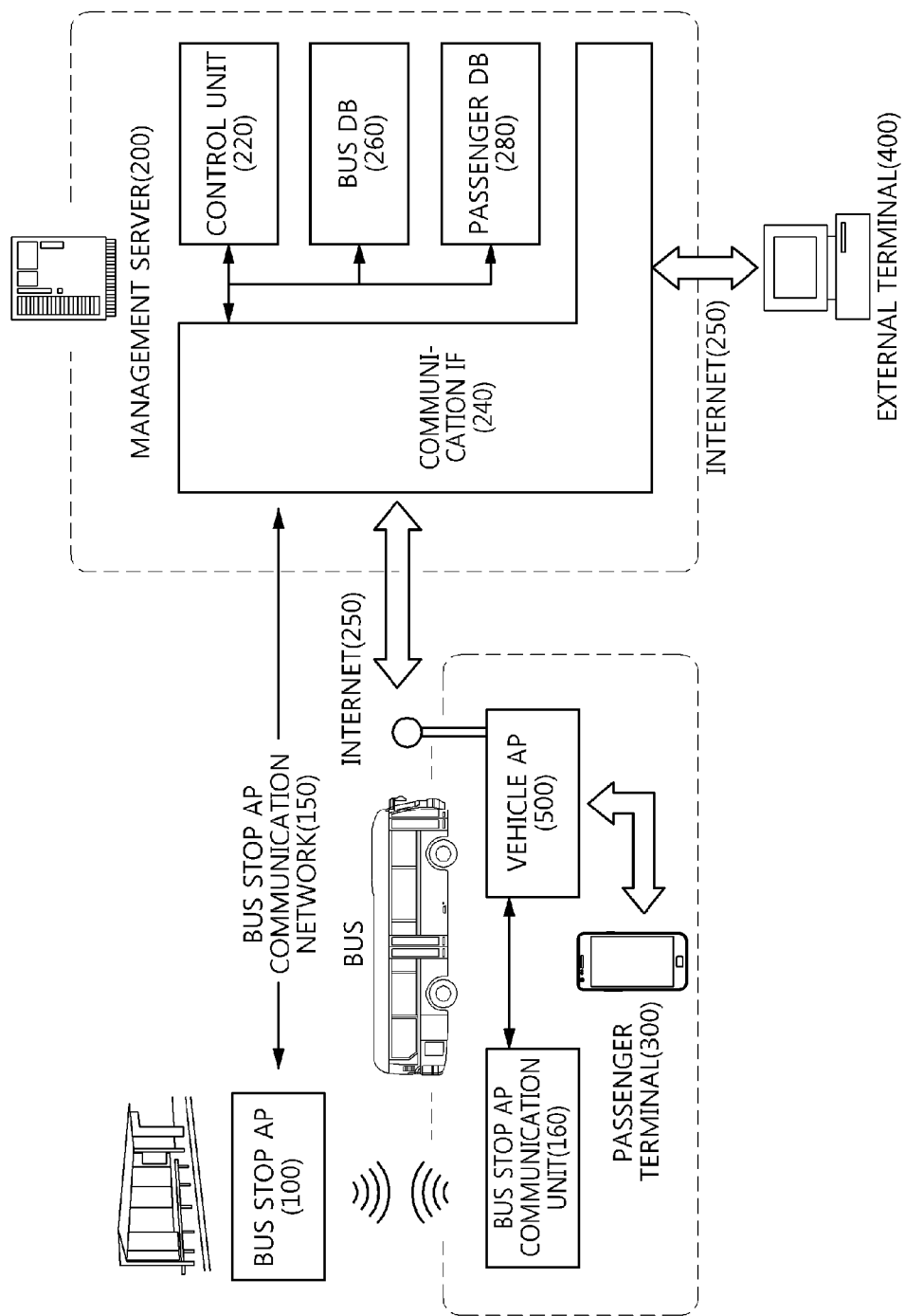
FIG. 8 is a diagram illustrating the operational relationship of the passenger terminal of a passenger on a bus in the IoT system according to the embodiment of the present invention.

FIG. 8 is a diagram illustrating the operational relationship of the passenger terminal 300 of a passenger on a bus in the IoT system according to the embodiment of the present invention. As described above with reference to FIG. 5, in the IoT system according to the embodiment of the present invention, when each passenger gets on a bus, the entrance tag reader 510 reads tag information from a corresponding passenger terminal 300, and then transfers the read tag information to the on-vehicle AP 500. The entrance tag reader 510 can perform bi-directional communication, and may transfer information, provided by the on-vehicle AP 500, to the passenger terminal 300. When each passenger gets off a bus, the exit tag reader 520 reads tag information from a corresponding passenger terminal 300, and then transfers the read tag information to the on-vehicle AP 500. Accordingly, the on-vehicle AP 500 may form a network along with the passenger terminals 300 of one or more passengers on the bus by referring to the tag information read by the entrance tag reader 510 and the exit tag reader 520, and may connect to the management server 200 over the Internet 250. Furthermore, the management server 200 may provide a specific service (e.g., bus stop or line guidance, transportation information, an advertisement service, or a multimedia data service) to the passenger terminals 300 of the passengers on the bus.

Figure 9:
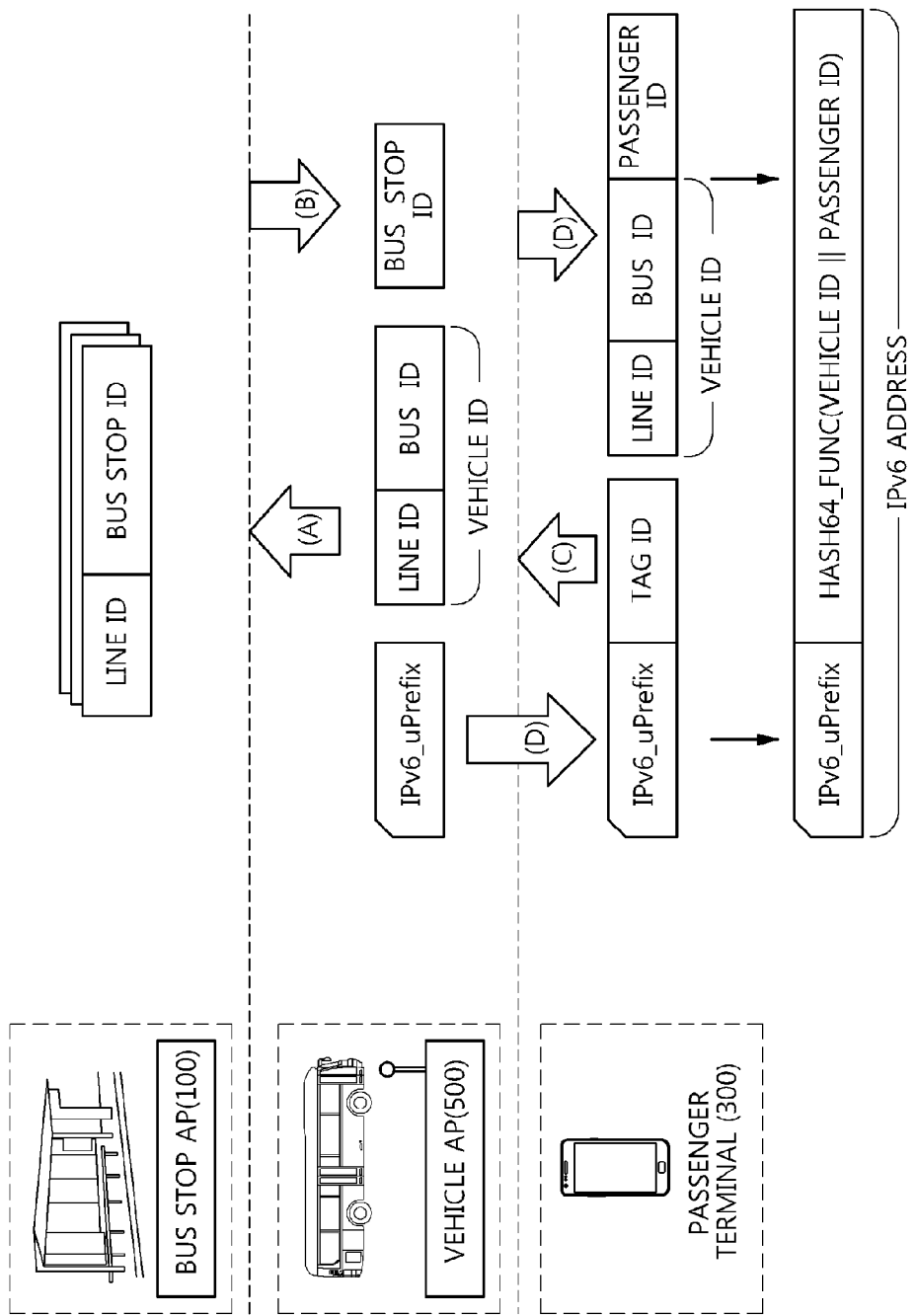
FIG. 9 is an example in which an individual ID and an IPv6 address are assigned in the IoT system according to an embodiment of the present invention.

FIG. 9 is an example in which an individual ID and IPv6 address are assigned in the IoT system according to the embodiment of the present invention. First, the bus stop APs 100 at respective bus stops are connected to the management server 200 over the bus stop AP communication network 150 as described above. Each of the bus stop APs 100 stores the bus stop ID of each bus stop, together with the line ID of each bus. The on-vehicle AP 500 provided in each bus stores an IPv6_uPrefix, i.e., the upper 64 bits of an IPv6 address adapted to perform packet communication with the management server 200 over the Internet 250, the line ID of the bus, and the bus ID of the bus for the line. In this case, the line ID and bus ID of the bus are used as a vehicle ID that is used to identify the bus associated with the line. Accordingly, the on-vehicle AP 500 may perform Internet packet communication with the management server 200 via the on-vehicle AP 500 based on an IPv6 address in which an IPv6_uPrefix forms the upper 64 bits thereof and a vehicle ID forms the lower 64 bits thereof.

In the IoT system for public transportation service according to the embodiment of the present invention, when a specific bus enters a bus stop:

(a) the on-vehicle AP 500 disposed on the bus sends a vehicle ID, including the line ID and bus ID of the bus, to the bus stop AP 100 via the bus stop AP communication unit 160 first;

(b) the bus stop AP 100 that has received the vehicle ID provides information about the bus stop to the on-vehicle AP 500 by sending a bus stop ID corresponding to the line ID to the on-vehicle AP 500;

(c) the entrance tag reader 510, when a passenger who carries a corresponding passenger terminal 300 gets on the bus, reads a tag ID from the passenger terminal 300 and provides the tag ID to the on-vehicle AP 500; and (d) the on-vehicle AP 500 sends an IPv6_uPrefix, i.e., the upper 64 bits of an IPv6 address, and a vehicle ID, including the line ID and bus ID of the bus, to the passenger terminal 300 with respect to the passenger terminal 300, in which case the on-vehicle AP 500 assigns a passenger ID adapted to identify the passenger terminal 300 of the passenger who has got on the bus, and sends the passenger ID, together with the IPv6_uPrefix and the vehicle ID.

Accordingly, the passenger terminal 300 of the passenger who has got on the bus may perform Internet packet communication with the management server 200 via the on-vehicle AP 500 using the IPv6_uPrefix, the vehicle ID, and the passenger ID as an IPv6 address.

Figure 10:
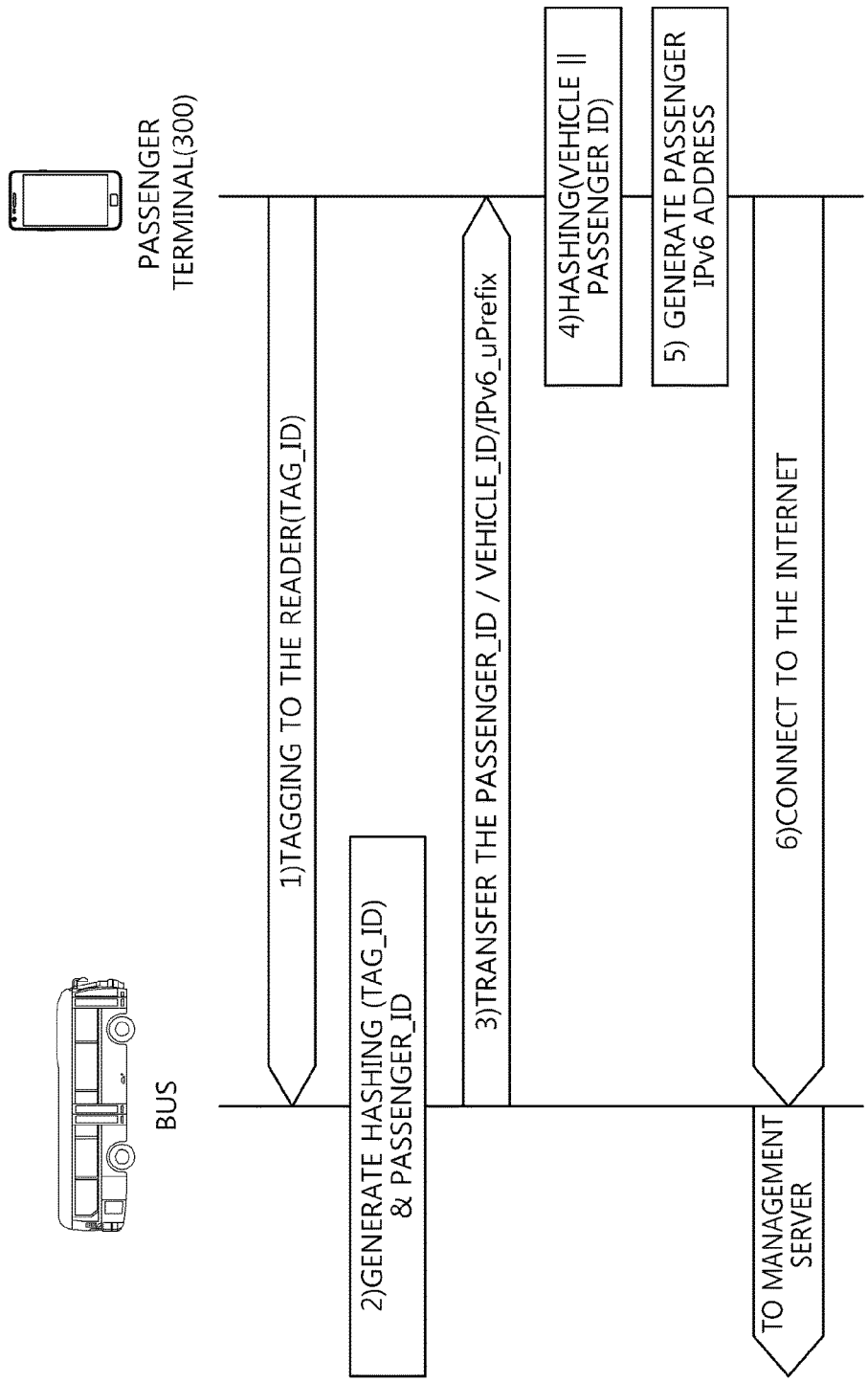
FIG. 10 is a diagram illustrating the flow of the provision of a service to the passenger terminal of a passenger on a bus.

FIG. 10 illustrates part of the method of operating an IoT system for public transportation service, and is a diagram illustrating the flow of the provision of a service to the passenger terminal 300 of a passenger on a bus.

1) When each passenger who carries the passenger terminal 300 gets on a bus, the entrance tag reader 510 reads a tag ID from the passenger terminal 300, and then sends the tag ID to the on-vehicle AP 500.

2) The on-vehicle AP 500 generates a passenger ID that is used to identify the passenger terminal 300 of the passenger who has got on the bus.

3) The on-vehicle AP 500 sends the generated passenger ID, a vehicle ID, and an IPv6_uPrefix to the passenger terminal 300 via the entrance tag reader 510.

4) The passenger terminal 300 of the passenger who has got on the bus hashes the IPv6_uPrefix, the vehicle ID, and the passenger ID.

5) The passenger terminal 300 of the passenger generates the IPv6 address of the passenger terminal 300 from the results of the hashing.

6) The passenger terminal 300 performs Internet packet communication with the management server 200 via the on-vehicle AP 500 using the generated IPv6 address.

Accordingly, the passenger terminals 300 of one or more passengers who have got on a vehicle may receive a specific data service (e.g., bus stop or line guidance, transportation information, an advertisement service, or a multimedia data service) as well as an Internet service because the management server 200 is connected to the on-vehicle AP 500 connected to the passenger terminals 300.

Figure 11:
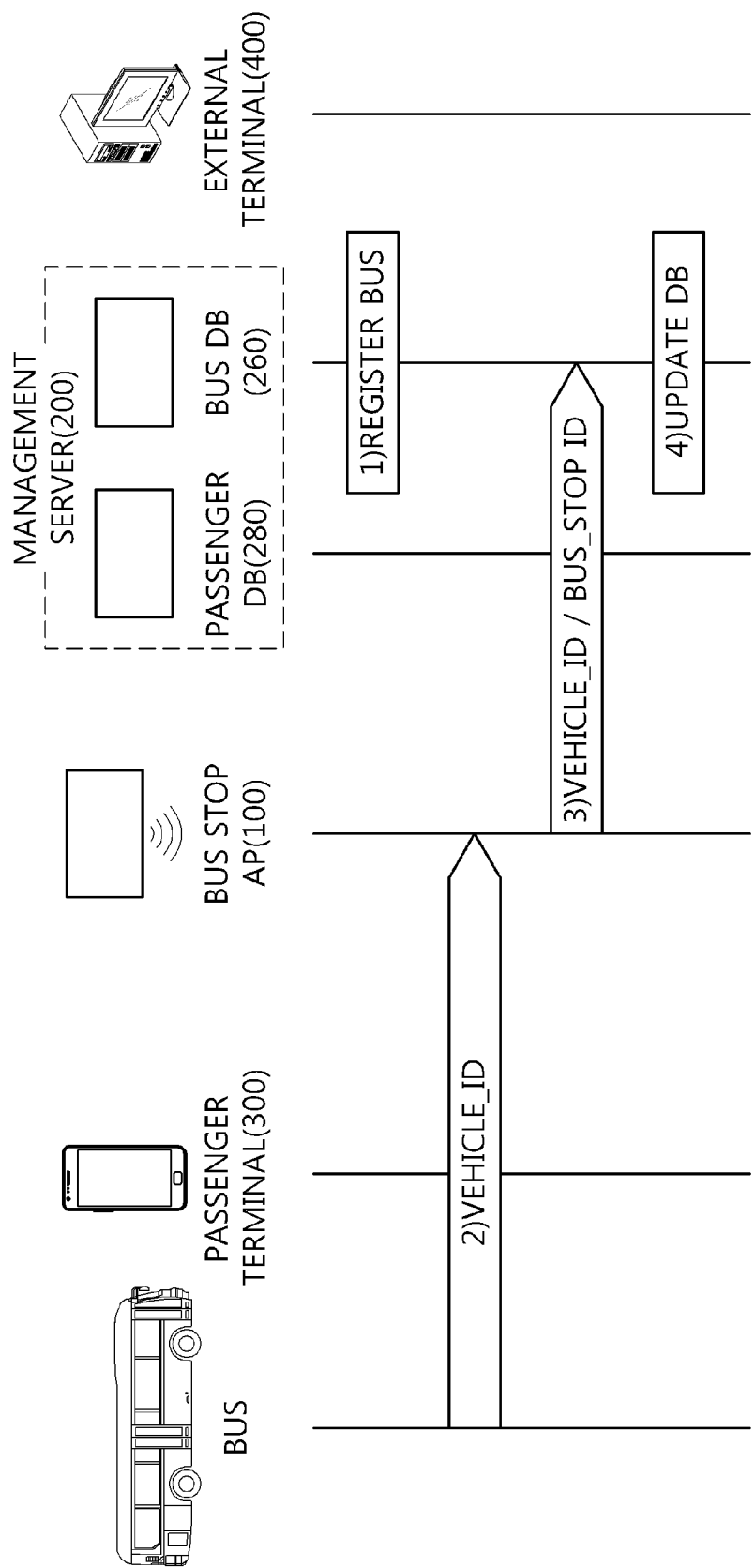
FIG. 11 is a diagram illustrating the flow of the collection of information about a bus and a bus stop.

FIG. 11 illustrates part of the method of operating the IoT system for public transportation service, and is a diagram illustrating the flow of the collection of information about a bus and a bus stop.

1) In the IoT system for public transportation service according to the embodiment of the present invention, a bus previously registers a vehicle ID, including the line ID and bus ID of the bus, with the bus DB 260 of the management server 200.

2) Thereafter, when the bus enters a bus stop, the on-vehicle AP 500 disposed on the bus sends the vehicle ID, including the line ID and bus ID of the bus, to the bus stop AP 100 via the bus stop AP communication unit 160.

3) The bus stop AP 100 that has received the vehicle ID sends the received vehicle ID and a bus stop ID to the management server 200 over the bus stop AP communication network 150.

4) The management server 200 updates the received vehicle ID and bus stop ID, and stores the updated vehicle ID and bus stop ID in the bus DB 260.

Accordingly, the management server 200 may inquire of the bus DB 260 about a bus stop through which the corresponding bus has passed using the vehicle ID.

Figure 12:
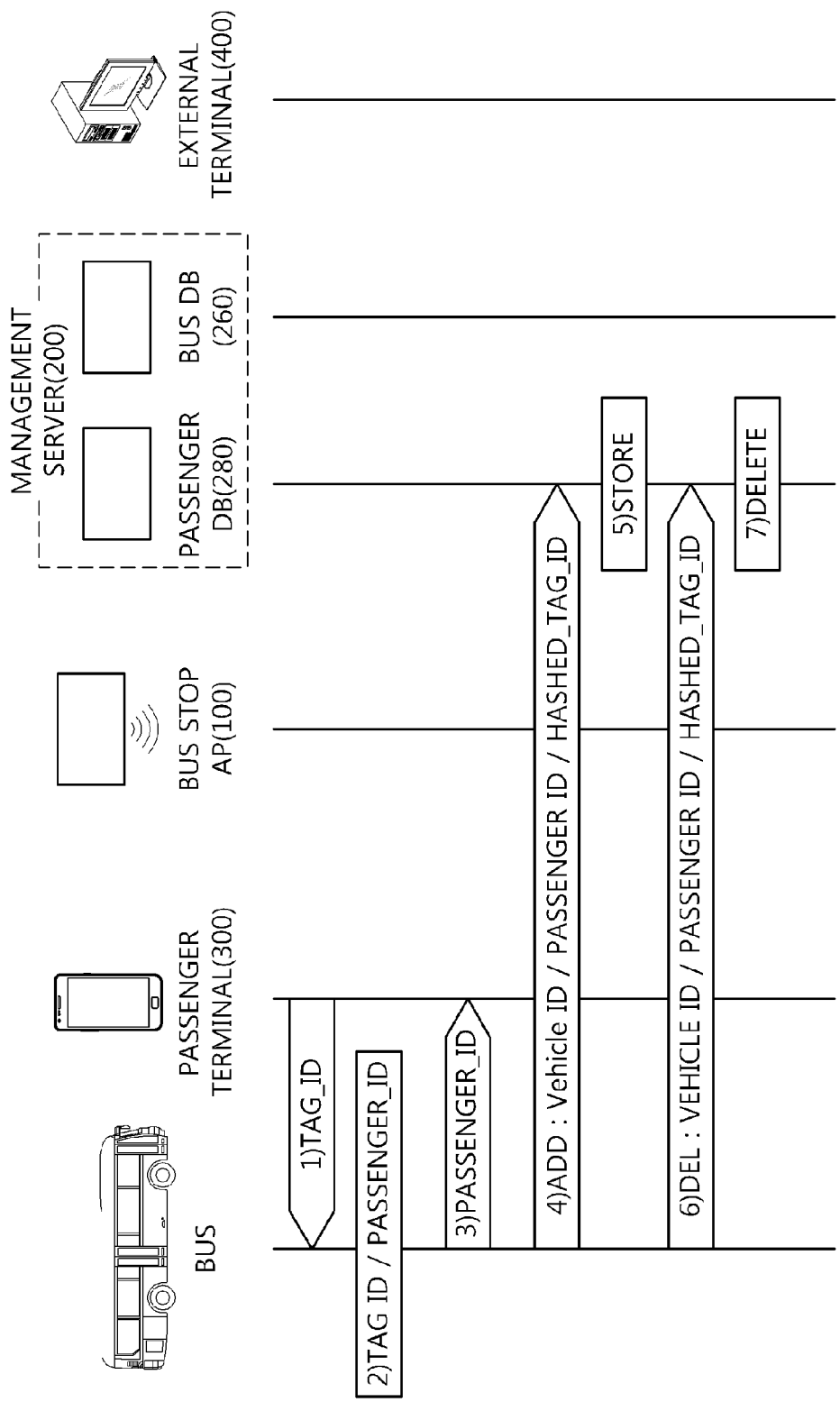
FIG. 12 is a diagram illustrating the flow of the collection of information about a passenger terminal.

FIG. 12 illustrates part of the method of operating the IoT system for public transportation service, and is a diagram illustrating the flow of the collection of information about the passenger terminal 300.

1) When a passenger who carries the passenger terminal 300 gets on a bus, the entrance tag reader 510 reads a tag ID from the passenger terminal 300, and then provides the tag ID to the on-vehicle AP 500.

2) The on-vehicle AP 500 generates a passenger ID that is used to identify the passenger terminal 300 of the passenger who has got on the bus.

3) The on-vehicle AP 500 sends the generated passenger ID, a vehicle ID and an IPv6_uPrefix to the passenger terminal 300 via the entrance tag reader 510.

4) Thereafter, the on-vehicle AP 500 sends information about the vehicle ID, the passenger ID, and the tag ID of the passenger to the management server 200.

5) The management server 200 stores the received information in the passenger DB 280.

Accordingly, the management server 200 may inquire about a vehicle on which a corresponding passenger has got based on only information about any one of the vehicle ID, the passenger ID, and the tag ID of the passenger. Furthermore, the management server 200 may inquire of the bus DB 260 about a bus stop through which the corresponding bus has currently passed using the vehicle ID.

Thereafter, when the passenger gets off the bus, 6) the exit tag reader 520 reads the tag ID from the passenger terminal 300 and then provides the read tag ID to the on-vehicle AP 500, and the on-vehicle AP 500 sends information about the vehicle ID, the passenger ID, and the tag ID of the passenger to the management server 200.

7) The management server 200 deletes the received information from data stored in the passenger DB 280.

Accordingly, the passenger DB 280 of the management server 200 stores only information about one or more passengers on a bus.

Figure 13:
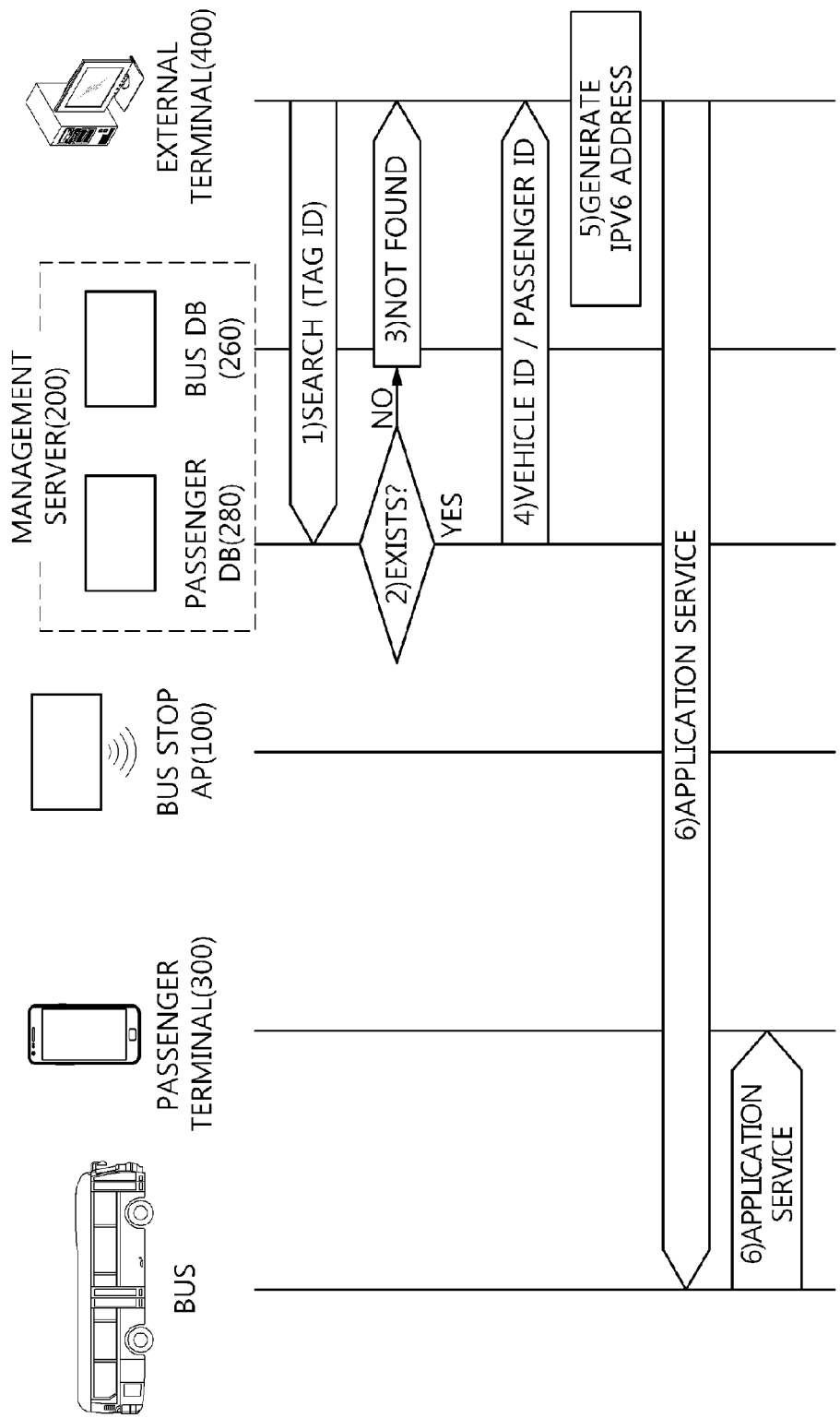
FIG. 13 is a diagram illustrating the flow of an inquiry about information about a passenger terminal and the flow of the provision of an additional service.

FIG. 13 illustrates part of the method of operating the IoT system for public transportation service, and is a diagram illustrating the flow of an inquiry about information about the passenger terminal 300 and the flow of the provision of an additional service.

1) The external terminal 400 connected to the management server 200 over the Internet sends an inquiry request using the tag ID of a specific passenger terminal 300 as inquiry data.

2) Thereafter, the management server 200 searches the passenger DB 280 for information including the corresponding tag ID.

3) If, as a result of the search, it is determined that the information including the corresponding tag ID is not present in the passenger DB 280, the management server 200 notifies the external terminal 400 that the passenger of the corresponding tag ID has not got on a bus.

4) If, as a result of the search, it is determined that the information including the corresponding tag ID is present in the passenger DB 280, the management server 200 sends a vehicle ID and a passenger ID stored along with the corresponding tag ID to the external terminal 400.

5) The external terminal 400 generates the IPv6 address of the passenger terminal 300 by hashing an IPv6_uPrefix, the vehicle ID, and the passenger ID. In this case, the IPv6_uPrefix may be provided when the external terminal 400 is connected to the management server 200, or may be provided by the management server 200 along with the vehicle ID and the passenger ID.

6) Thereafter, the external terminal 400 provides a service to the passenger terminal 300 of the passenger on the bus via the on-vehicle AP 500 of the bus using the generated IPv6 address.

As described above, the IoT system for public transportation service and the method of operating the same according to the embodiments of the present invention are advantageous in that information about one or more passengers on a public transportation means, such as a bus, a subway train, a train, a ship, or an airplane, and information about the public transportation means can be acquired.

Furthermore, the IoT system for public transportation service and the method of operating the same according to the embodiments of the present invention are advantageous in that a specific data service (e.g., bus stop or line guidance, transportation information, an advertisement service, or a multimedia data service) as well as an Internet service can be provided to the passenger terminals of one or more passengers on a vehicle.

Although the Internet-of-things system for public transportation service and the method of operating the same have been described in connection with the limited embodiments and drawings, the present invention is not limited to these embodiments. It will be apparent to those skilled in the art to which the present invention pertains that various modifications and variations can be made within the range of the following claims and the equivalent range thereof.

What is claimed is:

1. An Internet of things (IoT) system for public transportation service, the IoT system comprising:
   on-vehicle devices mounted within a bus as a means of public transportation;
   a management server connected to the bus over an Internet as a means of wireless communication;
   a plurality of bus stop access points (APs) as a means of short distance communication APs, the plurality of bus stop APs provided at respective bus stops and configured to enable information to be exchanged between the respective bus stops and the bus; and
   a wired/wireless bus stop access point (AP) communication network configured to connect the plurality of bus stop APs;
   wherein the management server performs Internet access processing to connect the bus stop AP communication network and an external terminal,
   wherein the on-vehicle devices send an IPv6 uPrefix, which is upper 64 bits of an IPv6 address, to a passenger terminal.

2. The IoT system of claim 1, wherein the on-vehicle devices comprise:
   a bus stop AP communication unit configured to communicate with the bus stop APs through which information is exchanged between the bus stops and the bus;
   an entrance tag reader configured to read tag information from the passenger terminal when a passenger carrying the passenger terminal gets on the bus;
   an exit tag reader configured to read the tag information from the passenger terminal when the passenger gets off the bus; and
   an on-vehicle AP configured to be connected to the bus stop AP communication unit, the entrance tag reader and the exit tag reader, collect the tag information from the passenger terminal, manage the collected tag information, form a network along with one or more passenger terminals, and control packet communication with the management server.

3. The IoT system of claim 2, wherein the on-vehicle AP is further configured to form a network with respect to one or more passengers on the bus using tag information of the passengers who have not got off the bus after getting on the bus by referring to tag information read by the entrance tag reader and the exit tag reader.

4. The IoT system of claim 1, wherein the management server comprises:
   a control unit;
   a communication interface (IF) configured to connect the management server to the bus stop AP communication network and the Internet for connecting on-vehicle APs provided in respective buses and the external terminal;

a bus database (DB) configured to receive information about the buses from the on-vehicle APs and store the received information; and a passenger DB configured to store passenger information including tag information provided by passenger terminals of passengers on the bus.

5. The IoT system of claim 2, wherein:

when the bus enters a bus stop, the on-vehicle AP disposed on the bus sends a vehicle ID, including a line ID and bus ID of the bus, to the bus stop AP via the bus stop AP communication unit;

the bus stop AP that has received the vehicle ID provides information about the bus stop to the on-vehicle AP by sending a bus stop ID corresponding to the line ID to the on-vehicle AP;

thereafter, when the passenger who carries the passenger terminal gets on the bus, the entrance tag reader reads a tag ID from the passenger terminal and then provides the tag ID to the on-vehicle AP;

the on-vehicle AP sends the $IPv6_{13}uPrefix$, and a vehicle ID, including the line ID and bus ID of the bus, to the passenger terminal;

wherein the on-vehicle AP assigns a passenger ID to identify the passenger terminal of the passenger who has got on the bus and sends the passenger ID along with the $IPv6_{13}uPrefix$ and the vehicle ID; and wherein the passenger terminal of the passenger who has got on the bus is configured to perform Internet packet communication with the management server via the on-vehicle AP using the $Ipv6_{13}uPrefix$, the vehicle ID, and the passenger ID as an Ipv6 address.

6. A method of providing service to a passenger terminal of a passenger on a vehicle in a method of operating an IoT system for public transportation service, the method of providing service comprising:

when the passenger who carries the passenger terminal gets on the vehicle, reading, by an entrance tag reader, a tag ID from the passenger terminal and sending, by the entrance tag reader, the tag ID to an on-vehicle AP;

generating, by the on-vehicle AP, a passenger ID that is used to identify the passenger terminal of the passenger on the vehicle;

sending, by the on-vehicle AP, the generated passenger ID, a vehicle ID, and an $IPv6_{13}uPrefix$ to the passenger terminal via the entrance tag reader;

hashing, by the passenger terminal of the passenger who has got on the vehicle, the $IPv6_{13}uPrefix$, the vehicle ID, and the passenger ID;

generating, by the passenger terminal of the passenger who has got on the vehicle, an IPv6 address of the passenger terminal using results of the hashing; and performing, by the passenger terminal, Internet packet communication with a management server via the on-vehicle AP using the generated IPv6 address.

7. A method of collecting information about a bus and a bus stop in a method of operating an IoT system for public transportation service, the method of collecting information comprising:

previously registering a vehicle ID, including a line ID and bus ID of the bus, with a bus DB of a management server;

when the bus enters the bus stop, sending, by an on-vehicle AP disposed on the bus, the vehicle ID, including the line ID and bus ID of the bus, to a bus stop AP via a bus stop AP communication unit;

sending, by the on-vehicie AP, an IPv6 uPrefix, which is upper 64 bits of an IPv6 address, to a passenger terminal;

sending, by the bus stop AP having received the vehicle ID, the received vehicle ID and a bus stop ID to the management server over the bus stop AP communication network; and updating, by the management server, the received vehicle ID and bus stop ID, and storing, by the management server, the updated vehicle ID and bus stop ID in the bus DB.

8. A method of collecting information about a passenger terminal in a method of operating an IoT system for public transportation service, the method of collecting information comprising:

when a passenger who carries the passenger terminal gets on a vehicle, reading, by an entrance tag reader, a tag ID from the passenger terminal and providing, by the entrance tag reader, the tag ID to an on-vehicle AP;

generating, by the on-vehicle AP, a passenger ID that is used to identify the passenger terminal of the passenger who has got on the vehicle;

sending, by the on-vehicle AP, the generated passenger ID, a vehicle ID, and an $IPv6_{13}uPrefix$ to the passenger terminal via the entrance tag reader;

sending, by the on-vehicle AP, information about the vehicle ID, the passenger ID, and the tag ID of the passenger to a management server; and storing, by the management server, the received information in a passenger DB; and when the passenger gets off the vehicle after getting on the vehicle, reading, by an exit tag reader, the tag ID from the passenger terminal, providing, by an exit tag reader, the read tag ID to the on-vehicle AP, and sending, by the on-vehicle AP, information about the vehicle ID, the passenger ID and the tag ID of the passenger to the management server; and deleting, by the management server, the received information from data stored in the passenger DB.

9. A method of making an inquiry about information about a passenger terminal and also providing an additional service in a method of operating an IoT system for public transportation service, the method of making an inquiry about information about a passenger terminal and also providing an additional service comprising:

sending, by an external terminal connected to a management server over an Internet, an inquiry request using a tag ID of the passenger terminal as inquiry data;

searching, by the management server, a passenger DB for information including the tag ID;

notifying, by the management server, the external terminal that a passenger of the tag ID has not got on a vehicle if, as a result of the search, it is determined that the information including the tag ID is not present in the passenger DB;

sending, by the management server, a stored vehicle ID and passenger ID, together with the tag ID, to the external terminal if, as a result of the search, it is determined that the information including the corresponding tag ID is present in the passenger DB;

generating, by the external terminal, an IPv6address of the passenger terminal by hashing an $IPv6_{13}uPrefix$, the vehicle ID, and the passenger ID; and providing, by the external terminal, a service to the passenger terminal of the passenger on the vehicle via an on-vehicle AP of the bus using the generated IPv6 address.

10. The method of claim 9, wherein the $IPv6_{13}uPrefix$ is provided when the external terminal accesses the management server or is provided by the management server along with the vehicle ID and the passenger ID.

* * * * *